(12) United States Patent
Inoue et al.

(10) Patent No.: US 9,557,626 B2
(45) Date of Patent: Jan. 31, 2017

(54) STABLE, HIGH EFFICIENCY, WAVELENGTH TUNABLE FIBER OPTIC PARAMETRIC OSCILLATOR

(71) Applicants: CANON KABUSHIKI KAISHA, Tokyo (JP); THE ARIZONA BOARD OF REGENTS on behalf of the UNIVERSITY OF ARIZONA, Tucson, AZ (US)

(72) Inventors: Yukihiro Inoue, Tama (JP); Dan Trung Nguyen, Tucson, AZ (US); Khanh Kieu, Tucson, AZ (US)

(73) Assignees: Canon Kabushiki Kaisha, Tokyo (JP); THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/192,747

(22) Filed: Jun. 24, 2016

(65) Prior Publication Data
US 2016/0377959 A1    Dec. 29, 2016

Related U.S. Application Data

(60) Provisional application No. 62/184,356, filed on Jun. 25, 2015.

(51) Int. Cl.
*G02F 1/35* (2006.01)
*G02F 1/39* (2006.01)
(Continued)

(52) U.S. Cl.
CPC ........... *G02F 1/395* (2013.01); *G02B 6/02323* (2013.01); *G02F 1/3536* (2013.01); *H01S 3/067* (2013.01);
(Continued)

(58) Field of Classification Search
None
See application file for complete search history.

(56) References Cited

U.S. PATENT DOCUMENTS

| 2004/0125434 | A1* | 7/2004 | Kumar | G02F 1/395 |
| | | | | 359/330 |
| 2005/0063425 | A1* | 3/2005 | Krastev | H04L 7/0075 |
| | | | | 372/6 |
| 2012/0292531 | A1* | 11/2012 | Grudinin | G01N 21/6458 |
| | | | | 250/459.1 |

OTHER PUBLICATIONS

Lei Zhang, Sigang Yang, Xiaojian Wang, Doudou Gou, Hongwei Chen, Minghua Chen, Shizhong , High-Efficiency All-Fibre Optical Parametric Oscillator Based on Photonic Crystal Fibres Pumped by Ytterbium-Doped Fibre Laser, Electronic Letters, Apr. 10, 2014, 50(8):624-626, The Institution of Engineering and Technology, Stevenage, UK, 2014.

(Continued)

*Primary Examiner* — Hemang Sanghavi
(74) *Attorney, Agent, or Firm* — Canon USA, Inc., IP Division (57) ABSTRACT

An optical apparatus comprising: a source and a loop. The source generates a pump. The resonating cavity of the source includes: a gain medium; and a tunable filter for selecting a wavelength. The loop comprises: an input coupler; a waveguide; and an output coupler. The input coupler receives the pump and a signal and outputs the pump and the signal into the waveguide In the waveguide, energy in the pump is transferred into energy in the signal while a relative center position of the signal is crossing a center position of the pump in a first direction while both are passing through the waveguide and into the output coupler. The output coupler r outputs a first portion of the signal and a second portion of the signal is fed into the input coupler as the signal, completing the loop.

15 Claims, 4 Drawing Sheets (51) Int. Cl.
*H01S 3/094* (2006.01)
*H01S 3/11* (2006.01)
*G02B 6/02* (2006.01)
*H01S 3/067* (2006.01)

(52) U.S. Cl.
CPC ........ *H01S 3/094003* (2013.01); *H01S 3/1115* (2013.01); *G02F 2001/3542* (2013.01)

(56) References Cited

OTHER PUBLICATIONS

Martin Baumgartl, Thomas Gottschall, Javier Abreu-Afonso, Antonio Díez, Tobias Meyer, Benjamin Dietzek, Manfred Rothhardt, Jürgen Popp, Jens Limpert, Andreas Tünnermann, Alignment-Free, All-Spliced Fiber Laser Source for CARS Microscopy Based on Four-Wave-Mixing, Optics Express, Aug. 29, 2012, 20 (19):21010-21018, The Optical Society, Washington, DC, 2012.

* cited by examiner

STABLE, HIGH EFFICIENCY, WAVELENGTH TUNABLE FIBER OPTIC PARAMETRIC OSCILLATOR

CROSS-REFERENCE TO RELATED APPLICATIONS

This application claims the benefit of U.S. Provisional Application No. 62/184,356, filed Jun. 25, 2015. U.S. Provisional Application No. 62/184,356 is hereby incorporated by reference.

BACKGROUND OF THE INVENTION

Field of the Invention

This disclosure generally relates to fiber based optical parametric oscillators.

Description of Related Art

Light sources based on optical parametric interaction are interesting since they provide access to laser wavelengths that existing gain materials based on electronic transitions cannot provide. An optical parametric oscillator (OPO) can be realized by exploiting the $\chi^{(2)}$ nonlinear optical response in a wide range of crystals or the $\chi^{(3)}$ nonlinear response in optical fibers.

Optical fiber based OPO (FOPO) are particularly attractive owning to their potential in achieving low cost, alignment-free and compact laser systems while still providing very wide tuning range and high power operation.

The operation of FOPOs is in essence based on degenerated four-wave-mixing (FWM) wherein two pump photons interact with the fiber to generate a signal photon and an idler photon. The exact frequencies of the signal and idler photons are defined by the phase matching condition which depends on the pump laser wavelength, its peak power as well as the dispersion profile of the optical fiber of the FOPO. There are two common ways to pump an OPO. The first approach is continuous pumping where the pump laser is a continuous wave laser or a laser generating long pulses compared to the OPO cavity round trip time. The second approach is based on synchronous pumping of pulsed pump laser. In the context of the present application, the optical frequency of signal photon may be greater than the optical frequency of the idler photon; or the optical frequency of signal photon may be less than the optical frequency of the idler photon. This has been done to simplify the explanation, a resonating ring cavity may be designed to operate to produce either a signal pulse or an idler pulse, while the description below has been written in terms of a signal pulse, but an embodiment may be made to operate to output either a signal pulse, an idler pulse, or both.

Pulsed lasers tend to have a broader output optical spectrum than continuous lasers. One way to narrow the spectral bandwidth of a pulsed laser is with the use of a spectral filter, preferably tunable, that is outside of the laser cavity. In which case, the spectral bandwidth of the pulsed laser is influenced mainly by the spectral shape of the spectral filter. Since, the spectral shape of the pump light is tuned with a wavelength tunable external filter; this makes it difficult for a narrow spectral bandwidth to be achieved. This is because the spectral bandwidth of the pump light is almost same as the spectral bandwidth of the tunable external filter. In which case, the conversion efficiency from pump light to signal light is drastically decreased due to the broad spectral bandwidth of the pump light. As a result, it is difficult to achieve a high peak power of the signal light.

BRIEF SUMMARY OF THE INVENTION

An embodiment may be an optical apparatus comprising: an optical source and an optical loop. The optical source may generate a pump pulse with a first optical wavelength. The resonating cavity of the optical source may include: a gain medium; and a wavelength tunable filter for selecting light as the first optical wavelength. The optical loop may comprise: an input optical coupler; an optical waveguide; and an output optical coupler. The input optical coupler may comprise: a first port for receiving the pump pulse; a second port for receiving a signal pulse, wherein the signal pulse has a second optical wavelength different from the first optical wavelength; and a third port for outputting the pump pulse and the signal pulse. The optical waveguide may comprise: a fourth port for receiving the pump pulse and the signal pulse; a fifth port outputting the pump pulse and the signal pulse. Wherein in the optical waveguide energy in the pump pulse may be transferred into energy in the signal pulse while a relative center position of the signal pulse is crossing a center position of the pump pulse in a first direction while both are passing through the waveguide. The output optical coupler may comprise: a sixth port for receiving the pump pulse and the signal pulse; a seventh port for outputting a first portion of the signal pulse; and an eighth port for outputting a second portion of the signal pulse. Wherein, the first portion of the signal pulse from the seventh port of the output coupler may be fed into the second port as the signal pulse, completing the optical loop.

In an embodiment, the optical source may further comprise: wherein the resonating cavity may be a linear cavity; a saturable absorber may form a first terminus of the linear cavity; wherein the optical source may be passive mode locked to produce the pump pulse at the first optical wavelength; a dispersion compensator may form a second terminus of the linear cavity; the wavelength tunable filter is between the saturable absorber and the dispersion compensator in the linear cavity; and a doped optical fiber having linear optical gain is also between the saturable absorber and the dispersion compensator in the linear cavity.

In an embodiment, within the resonating cavity of the optical source may include a variable delay line.

In an embodiment, the saturable absorber may mode lock the optical source.

In an embodiment, the following equations may be satisfied: $0.1 \text{ nm} \leq \Delta\lambda \leq 1.0 \text{ nm}$; and $D_{cavity} \times L \geq 1$ ps/nm. Wherein $\Delta\lambda$ is the bandwidth of the tunable filter at full width half maximum. Wherein $D_{cavity}$ is the dispersion parameter of the cavity of the optical source. Wherein L is the total cavity length of the optical source.

In an embodiment, the dispersion parameter $D_{cavity}$ of the optical source is kept within the limit of following equation by a chirp in a chirped fiber Bragg grating that acts as a dispersion compensator of the cavity of the optical source: $D_{cavity} \times L \geq 1$ ps/nm.

In an embodiment, the energy of the pump pulse may be converted to the energy of the signal pulse by a parametric process in the waveguide.

In an embodiment, a third idler pulse may be produced by the waveguide.

In an embodiment, the optical waveguide may comprise a photonic crystal fiber.

In an embodiment, the optical loop may further comprise a second waveguide. The length of the second waveguide may satisfy the following equation: $L_3 \geq t/D_{pulse}$. Wherein $L_3$ is the length of the third waveguide. Wherein t is the pulse duration of the pump pulse. $D_{pulse}$ is the dispersion parameter of the signal pulse in the second waveguide.

In an embodiment, the second waveguide may change a chirp in the signal pulse produced by the optical waveguide.

In an embodiment, the chirp in the second pulse may be positive.

In an embodiment, the chirp in the second pulse may be negative.

In an embodiment, the second waveguide may be located between the seventh port of the output coupler and the second port of the input coupler, and the first portion of the signal pulse is fed through the second waveguide.

In an embodiment, the optical apparatus, may further comprise: an optical amplifier between the optical source and the first port of the input coupler that amplifies the optical power of the pump pulse.

DETAILED DESCRIPTION OF THE INVENTION

Embodiments will be described below with reference to the attached drawings.

Example

Figure 1:
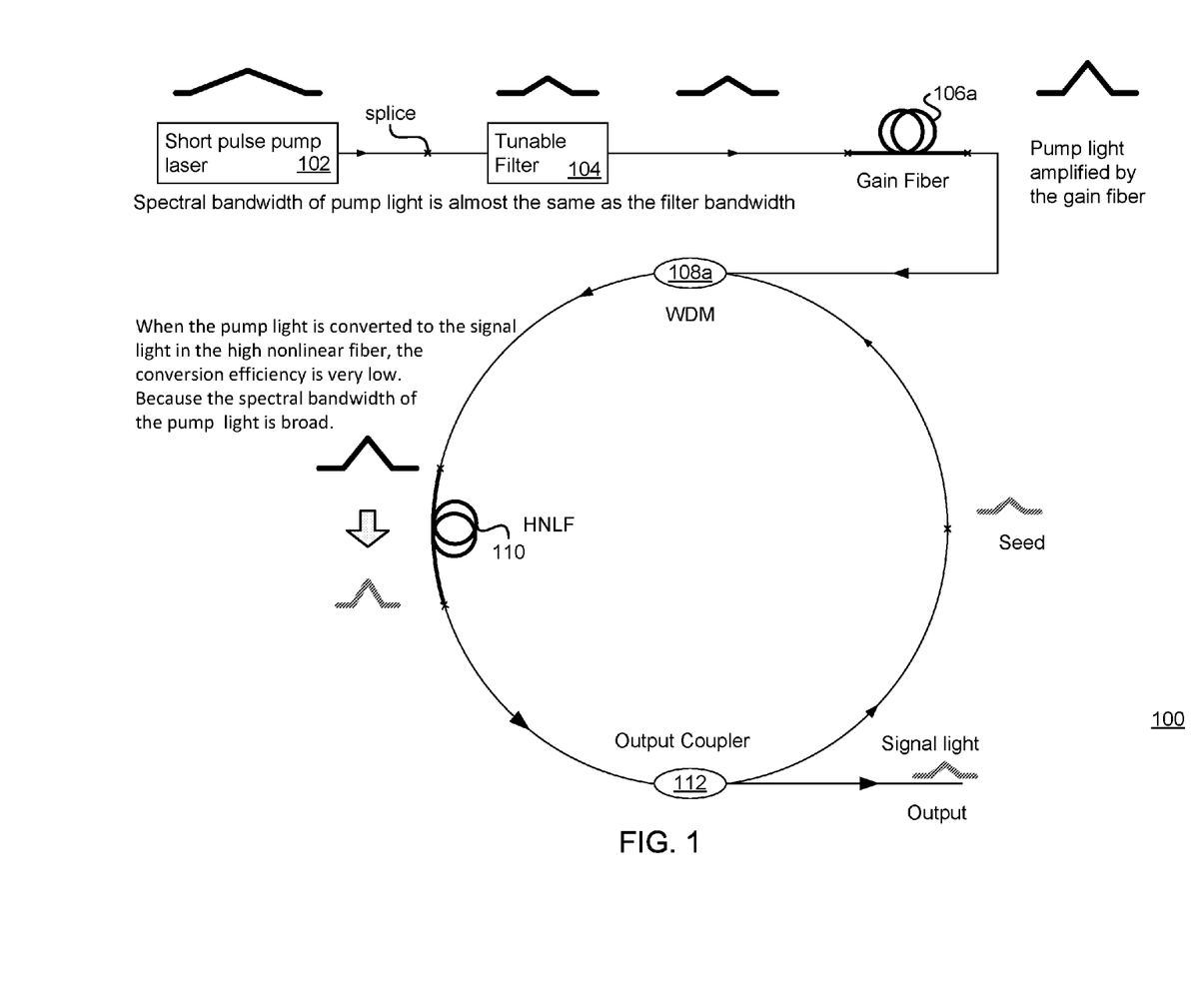
FIG. 1 is an illustration of an embodiment.

When the optical spectral bandwidth of the pump light is almost same as the bandwidth of the tunable filter, the conversion efficiency from the pump light to the signal light is reduced because of the broad spectral of the pump light. FIG. 1 is an illustration of such an optical apparatus 100.

The optical apparatus 100 is an illustration of a fiber optic parametric oscillator pumped by a standard pulsed light source 102 which is then filtered by a tunable filter 104. A light source 102 may be a semiconductor laser, or some other type of a laser that produces pulsed light. The light source 102 may be modulated to form a pulse by modulating the current applied to the gain medium of the light source 102. The light source 102 has a short temporal width but a relatively wide spectral width.

The short pulse from the light source 102 is then optically filtered by the tunable filter 104. The light source 102 and the tunable filter 104 may be fiber coupled. In which case, a fiber from the light source 102 may be spliced to a fiber from the tunable filter 104. The splice between the fibers is illustrated as a small x as illustrated in FIG. 1 and the following figures. The optical fibers are illustrated as lines between the optical components as shown in FIG. 1 and the following figures. A fiber from the tunable filter 104 may be spliced to a first gain fiber 106a. The first gain fiber 106a provides linear optical gain to an intensity of the pulse exiting the tunable filter 104.

The first gain fiber 106a may be spliced to a first input port of a first wavelength division multiplexer (WDM) 108a. An output port of the first WDM 108a may be spliced to a first end of a highly non-linear fiber (HNLF) 110. A second end of the HNLF 110 may be spliced to an input port of an output coupler 112. A first output port of the output coupler 112 may be spliced to a second input port of the first WDM 108a. The optical components 108a, 110, and 112 form an optical loop. The optical loop forms an optical parametric oscillator (OPO). A second output port of the output coupler 112 outputs light from the OPO.

The spectral bandwidth of the short pulse pump laser 102 is relatively wide as illustrated by the pulse shown above the short pulse pump laser 102 in FIG. 1. The spectral bandwidth of the pump light coming out of the tunable filter 104 is almost the same as the filter bandwidth of the tunable filter 104. The spectral bandwidth of the tunable filter 104 is illustrated above tunable filter 104 in FIG. 1. The spectral bandwidth of the optical pulse exiting the tunable filter 104 is illustrated between the tunable filter 104 and the first gain fiber 106a in FIG. 1. The peak intensity of the optical pulse is increased by the first gain fiber 106a, while the spectral bandwidth remains the same as illustrated by the pulse shown next to the first gain fiber 106a.

The HNFL 110 provides non-linear gain, which in the context of an OPO means that a pump light pulse with an optical frequency of $\omega_p$ is converted into two light pulses, a signal light pulse with a frequency of $\omega_s$ and a idler light pulse with a frequency of $\omega_i$. Such that $2\omega_p = \omega_s + \omega_i$. The efficiency of this non-linear process is dependent upon the peak pulse intensity at the peak optical frequency. Thus, the spectral broadness of the pump light pulse limits the peak intensity of the pulse produced by the HNLF 110. When the pump light is converted to the signal light in the HNLF 110, the conversion efficiency is very low, because the spectral bandwidth of the pump light is relatively broad. This non-linear process is illustrated in FIG. 1 by showing how the black pulse produces a new grey pulse shown next to the HNLF 110. The new grey pulse represents the seed and idle pulse. The output coupler then splits these pulses and outputs a portion of the produced light as signal light. Another portion of the produced light is feedback into the WDM to recirculate in the optical loop of the OPO. In the context of the present application, the optical frequency of signal light pulse may be greater than the optical frequency of the idler light pulse; or the optical frequency of signal light pulse may be less than the optical frequency of the idler light pulse.

Due to the broadness of the pump pulse, it is difficult to achieve a high peak power of the signal light.

Embodiment 1

The applicants have found a way to increase the peak power of the signal light exiting the FOPO. This may be done by inserting a wavelength tunable filter into the cavity of the pump laser for the FOPO. Such that the total cavity dispersion and the filter bandwidth satisfy the following equations (1).

$$0.1 \text{ nm} \leq \Delta\lambda \leq 1.0 \text{ nm} \qquad (1)$$

$$D_{cavity} \times L \geq 1 \frac{\text{ps}}{\text{nm}}$$

$$\frac{dT}{d\lambda} = D_{cavity} \times L$$

In which: $\Delta\lambda$ is the spectral bandwidth of the tunable filter; $D_{cavity}$ is a dispersion parameter of the cavity of the pump laser; L is the total cavity length of the pump laser; and T is total round trip time of the cavity of the pump laser. Wherein, these equations are relevant over the wavelength range of the pump light.

If the limitations listed in equation (1) are used to design the pump laser then the optical spectral bandwidth of the pump light is narrower than the optical bandwidth of the internal tunable filter. So, a narrow spectral bandwidth can be achieved, the conversion efficiency from the pump light to the signal light can be increased. Thus, it is possible to get a high peak power signal light.

Embodiment 2

Figure 2:
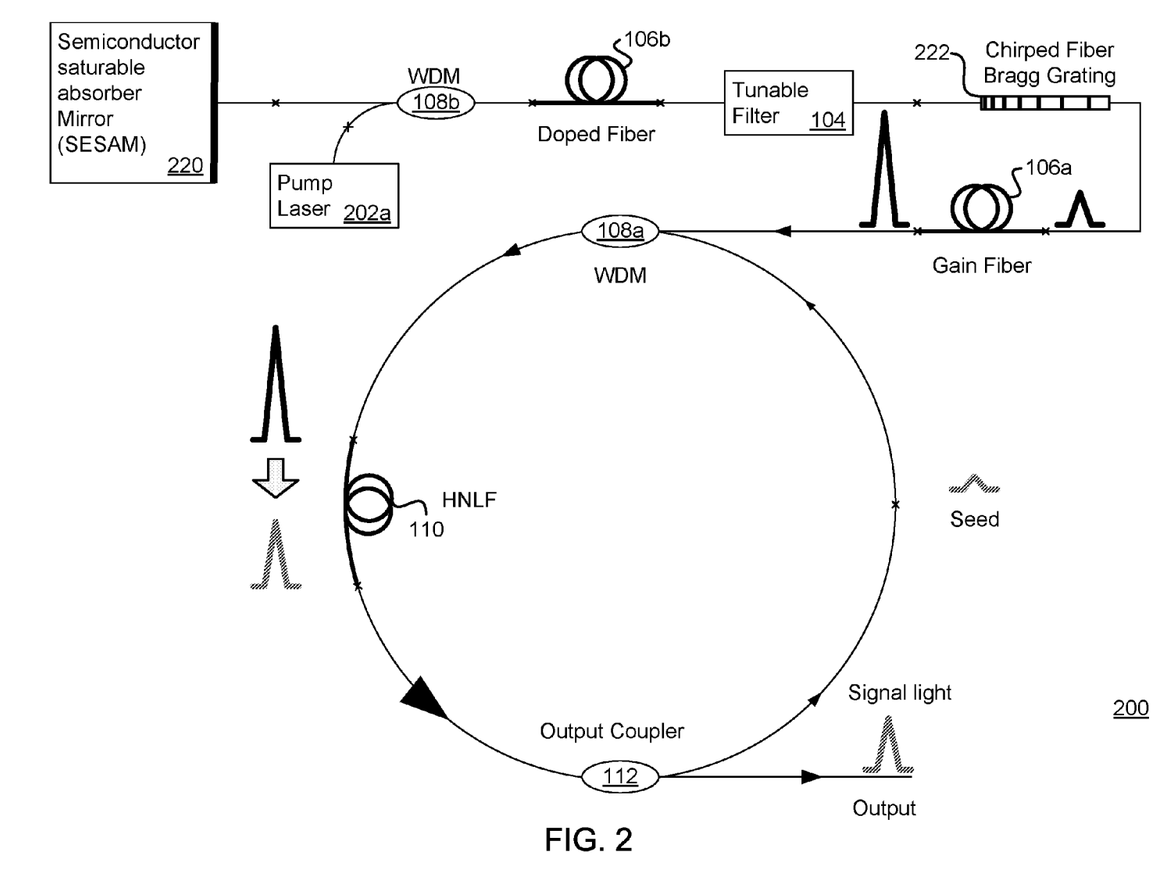
FIG. 2 is an illustration of an embodiment.

FIG. 2 is an illustration showing a schematic of a fiber optical parametric oscillator (FOPO) 200 which is an embodiment. This FOPO includes a tunable laser which pumps the oscillator. The tunable laser portion of the FOPO 200 may include a semiconductor saturable absorber mirror (SESAM) 220 which is used as saturable absorber. An example of SESAM that may be used in an embodiment is the SAM-1040-40-500fs-x sold by Batop GmbH of Jena, Del. The absorbance of the SESAM 220 may be 40%. The modulation depth of the SESAM 220 may be 24%. The relaxation time of the SESAM 220 may be 500 femtoseconds (fs). The saturation fluence of the SESAM 220 may be 120 microjoules per square centimeter ($\mu J/cm^2$).

The SESAM 220 may be fiber coupled. The SESAM 220 may be spliced to a first port of a second WDM 108b. A fiber coupled first pump laser 202a may be spliced to a second port of the second WDM 108b. The second WDM 108b may combine the pump light from the second port with light from the first port and output it through a third output port of the second WDM 108b.

The third output port of the second WDM 108b may be spliced to a first end of a second doped gain fiber 106b. The second gain fiber 106b may be a polarization maintaining Ytterbium doped fiber. The length of the second gain fiber 106b may be 0.8 meters (m).

The second end of the second gain fiber 106b may be spliced to a first port of the wavelength tunable filter 104 which may be used for selecting a center wavelength of a seed for the tunable pump laser. The optical spectral bandwidth of the wavelength tunable filter may be 1 nm. The tuning range of the wavelength tunable filter may be 1020-1060 nm.

A second port of the wavelength tunable filter may be spliced to a first end of a chirped fiber Bragg grating (CFBG) 222 which may be used as dispersion compensator. The chromatic dispersion in the chirped fiber Bragg grating CFBG 222 may be +1 to +5 picoseconds per nm (ps/nm) at the center wavelength of the CFBG 222. The reflectivity of the CFBG 222 may be 50%. The range over which the CFBG 222 has this reflectivity and this dispersion may be 1020-1060 nanometers (nm). The SESAM 220 and the CFBG 222 from a resonating cavity for the tunable laser portion of the FOPO 200. The chirp in the CFBG 222 can be designed such that the dispersion parameter of the pump laser cavity $D_{cavity}$ is kept within the limit described by equation (1) listed above.

The tuning wavelength range of the tunable laser portion of the FOPO 200 may be around 1020-1060 nm. The average power of the tunable laser portion of the FOPO 200 may be around 1 milliwatt (mW). The peak power of the tunable laser portion of the FOPO 200 may be around 4 Watts (W). The repetition rate of the tunable laser portion of the FOPO 200 may be around 50 megahertz (MHz). The pulse duration of the tunable laser portion of the FOPO 200 may be around 5 picoseconds (ps). The optical spectral bandwidth of the tunable laser portion of the FOPO 200 may be around 0.3 nm.

The tunable laser portion of the FOPO 200 may be operated as a seed laser that is then amplified by a double clad fiber amplifier. The double clad fiber amplifier may include a polarization maintaining double clad Ytterbium doped as the first gain fiber 106a. The CFBG 222 may be spliced to one end of the first gain fiber 106a. The length of the first gain fiber 106a may be 1.2 m. After being amplified, the average power of the pump light is around 10 mW. The peak power of the pump light after being amplified may be 40 W.

A second end of the first gain fiber 106a may be spliced to an input port of the first WDM 108a. An output port of the first WDM 108a may be spliced to a first end of the HNLF 110. A second end of the HNLF 110 may be spliced to an input port of the coupler 112. An output port of the coupler 112 may be spliced to a second port of the first WDM 108a. The optical components 108a, 110, and 112 form a ring type resonating cavity of the FOPO. The HNLF 110 of the FOPO resonating cavity converts the pump light from the gain fiber into signal light which is outputted from a second output port of the coupler 112.

Figure 3:
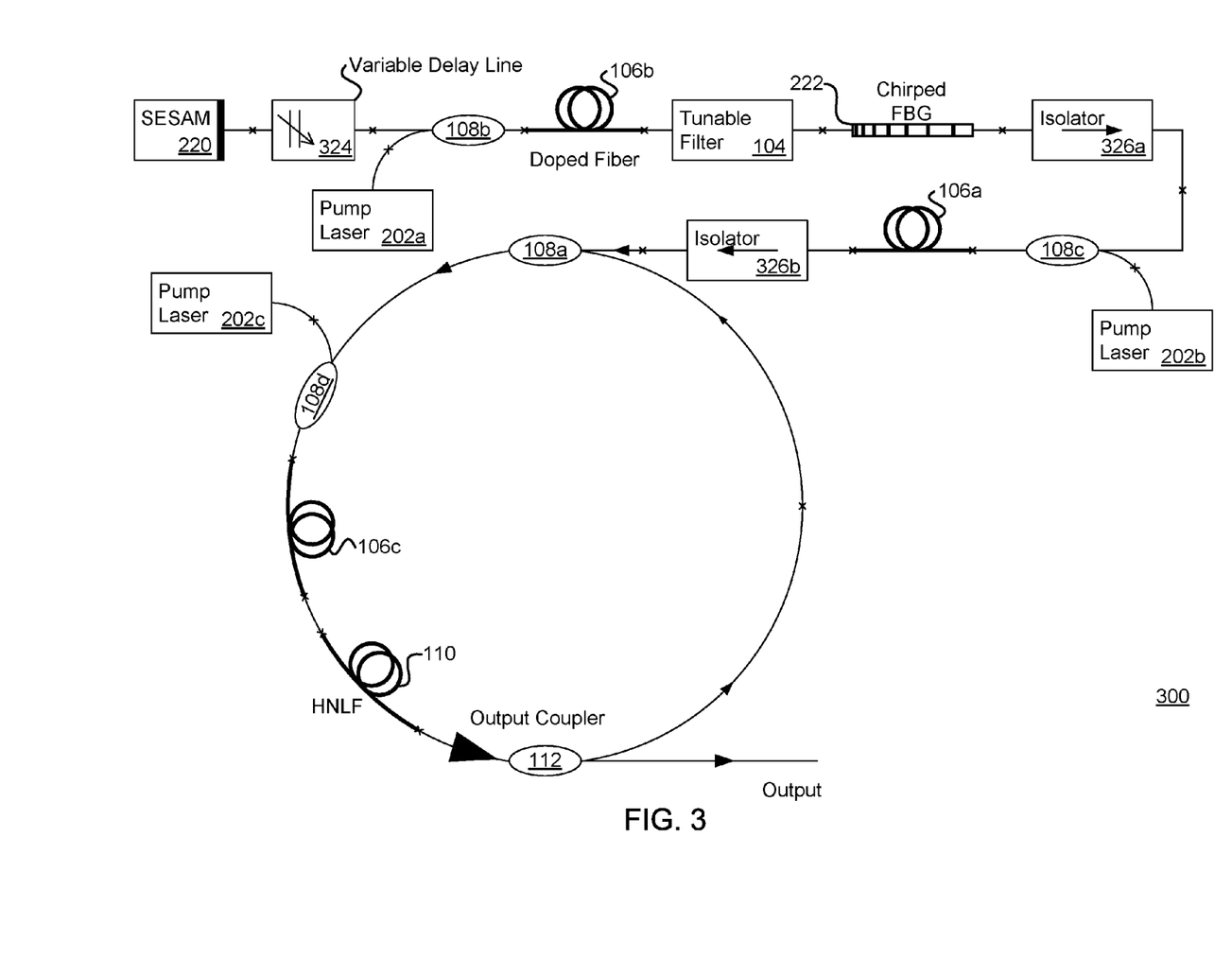
FIG. 3 is an illustration of an embodiment.

In an alternative embodiment, the FOPO resonating cavity may also include a third gain fiber 106c (which is not shown in FIG. 2 and is shown in FIG. 3). The pump light is further amplified by the third gain fiber 106c to produce further amplified pump light with an average power of 1 W. The peak power of the pump pulse exiting the third gain fiber 106c may be 4 kilowatts (kW).

The HNLF 110 may be a polarization maintaining photonic crystal fiber. The zero dispersion wavelength of the HNLF 110 may be 1050 nm. The $3^{rd}$ order dispersion of the HNLF 110 may be 6.71776 E-41 seconds cubed per meter ($s^3/m$). The $4^{th}$ order dispersion of the HNLF 110 may be −9.83483 E-56 seconds to the power of four per meter ($s^4/m$). The nonlinear coefficient of the HNLF 110 may be 10 watts per kilometer (W/km). The length of the HNLF 110 may be 30 centimeters (cm).

The tunable wavelength range of the signal light exiting the second output port of the coupler 112 of the FOPO 200 may be 750-950 nm. The average power of the signal light exiting the second output port of the coupler 112 of the FOPO 200 may be 150 mW. The peak power of the signal light exiting the second output port of the coupler 112 of the FOPO 200 may be 1 kW. The repetition rate of the signal light exiting the second output port of the coupler 112 of the FOPO 200 may be 50 MHz. The pulse duration of the signal light exiting the second output port of the coupler 112 of the FOPO 200 may be 3 ps. The spectral bandwidth of the signal light exiting the second output port of the coupler 112 of the FOPO 200 may be 15 nm. The HNLF 110 produces both signal and idler light. A filter may be placed within the FOPO 200 to remove idler light from the resonating cavity of the FOPO 200. In an alternative embodiment, a filter may be placed within the FOPO 200 to remove signal light from the resonating cavity of the FOPO 200. WDM 108a may act as such a filter to remove either signal or idler light from the resonating cavity of the FOPO 200.

Embodiment 3

FIG. 3 is an illustration showing a schematic of a FOPO 300 which is an embodiment. The FOPO 300 is substantially similar to FOPO 200. The FOPO 220 may also include a variable delay line 324 inserted between the second WDM 108b and the SESAM 220. The FOPO 300 may also include a first isolator 326a between the CFBG 222 and the third WDM 108c. A second end of the CFBG 222 may be spliced to an input port of the first isolator 326a. The output port of the first isolator 326a may be spliced to a first input port of a third WDM 108c. A second pump laser 202b may be spliced to an input port of the third WDM 108c. An output port of the third WDM 108c may be spliced to the first end of the first gain fiber 106a. The FOPO 300 may also include a second isolator 326b between the first gain fiber 106a and the first WDM 108a. The second end of the first gain fiber 106a may be spliced to a first input port of the second isolator 326b. The output port of the second isolator 326b may be spliced to a first input port of the first WDM 108a. Fourth WDM 108d and the third gain fiber 106c may be between the first WDM 108a and the HNLF 110. The output port of the first WDM 108a may be spliced to an input port of the fourth WDM 108d. A third pump laser 202c may be spliced to a second input port of the fourth WDM 108d. An output port of the fourth WDM 108d is spliced to a first end of the third gain fiber 106c. A second end of the third gain fiber 106c may be spliced to the first end of the HNLF 110.

The variable delay line 324 may be used to optimize the length of the cavity as the lasing wavelength is changed by the tunable filter 104. The variable delay line 324 may also work in combination with the chirp in the CFBG 222 such that the dispersion parameter of the pump laser cavity $D_{cavity}$ is kept within the limit described by equation (1) listed above. The first isolator 326a may be used to prevent light from the first gain fiber 106a and the FOPO ring cavity from reaching the CFBG 222 and being reflected back by the CFBG 222. Such reflections may destabilize the FOPO 300. The second isolator 326b may be used to prevent light from the FOPO ring cavity from entering the first gain fiber 106a, which may destabilize the gain in the first gain fiber 106a or steal gain from the pump light provided by the first gain fiber 106a.

Embodiment 4

Figure 4:
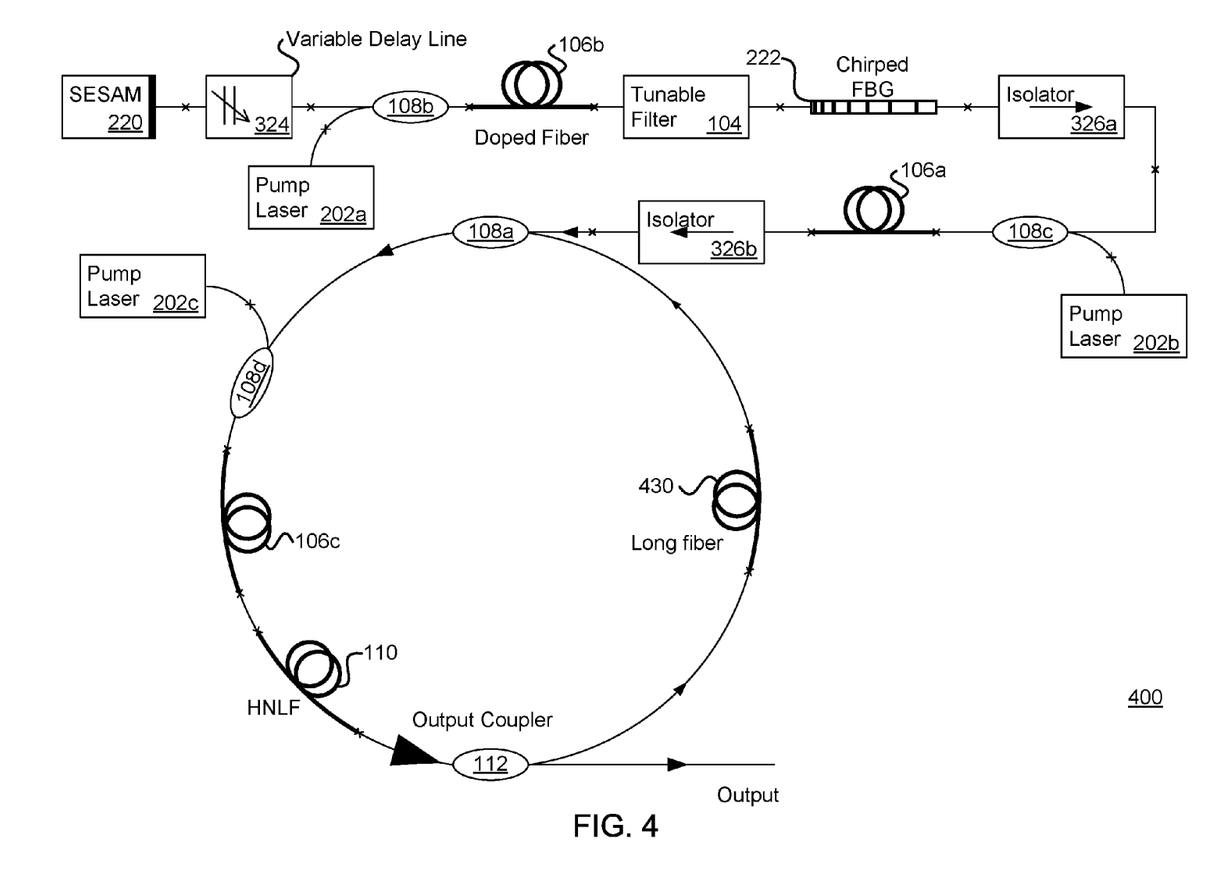
FIG. 4 is an illustration of an embodiment.

FIG. 4 is an illustration showing a schematic of a FOPO 400 which is an embodiment. The FOPO 400 is substantially similar to the FOPO 300. The FOPO 400 may include a long fiber 430 between the output coupler 112 and the WDM 108a. A second output port of the output coupler 112 may be spliced to a first end of the long fiber 430. A second end of the long fiber 430 may be spliced to the second input port of the first WDM 108a. In an alternative embodiment, the resonating cavity of the FOPO may also include a variable delay line which is varied as the output wavelength of the FOPO is varied. The length $L_3$ of the long fiber may be 100 meters (m). The length $L_3$ of the long fiber may be chosen based on equation (2) listed below.

$$L_3 \geq \frac{t}{D_{pulse}} \quad (2)$$

The time t is the full width half max pulse duration of the pump pulse. The dispersion parameter $D_{pulse}$ is a dispersion parameter of the signal pulse as defined in equation (3) below.

$$D_{pulse} \geq \frac{1}{L_3} \frac{\partial \Phi(\lambda)}{\partial \lambda} \quad (3)$$

The function $\Phi(\lambda)$ is the temporal relative position over a narrow wavelength range centered at the wavelength $\lambda$ of a peak light intensity relative to the average peak light intensity over the entire signal pulse. Alternatively, instead of the peak light intensity it may be the average or median light intensity. The function $\Phi(\lambda)$ may also represent a difference between a first value and a second value. Wherein, a first value represents a full width half max temporal width as function of the wavelength of the signal pulse before it enters the long fiber 430. Wherein, a second value represents a full width half max temporal width as a function of the signal pulse after it leaves the long fiber 430. Thus, $\Phi(\lambda)$ represents the effect of the long fiber 430 on the signal pulse. Equation (3) may be evaluated at the peak wavelength of the signal pulse. This long fiber 430 may work as a wavelength filter. The product of the dispersion parameter $D_{pulse}$ and the length $L_3$ may be 10 picoseconds per nanometer (ps/nm). The wavelength bandwidth of the tunable filter 104 may be 0.5 nm.

The tunable wavelength range of the signal light produced by the FOPO 400 is 750-950 nm. The average power of the signal light produced by the FOPO 400 is 150 mW. The peak power of the signal light produced by the FOPO 400 is 1 kW. The repetition rate of the signal light produced by the FOPO 400 is 50 MHz. The pulse duration of the signal light produced by the FOPO 400 is 3 ps. The spectral bandwidth of the signal light produced by the FOPO 400 is 0.5 nm.

The arrangement of these optical components in this manner having these properties allows the FOPO 400 to efficiently convert the pump light to the signal light. It is thus possible to get a high peak power of the signal light.

An embodiment is a narrow spectrum, high power tunable fiber laser in 750-950 nm range with a less than 1 nm spectral bandwidth, approximately 100 mW of average optical power, and approximately 3 nJ of optical pulse energy. An embodiment may exploit the four wave mixing (FWM) effect in a bendable Photonic Crystal Fiber (PCF) as the HNLF.

An embodiment may include a fiber (such as fiber 430) in the resonating ring of the FOPO placed after HNLF 110 that applies a positive or negative chirp to one or both of the signal or idler pulse that exits the HNLF 110. The applicants have found that this can result in a narrowing of subsequent pulses which exit the HNLF 100. This structure provides FOPO 400 that produces a narrowing of the output spectrum of the signal pulse while still keeping the same tuning range of the FOPO 400.

The chromatic dispersion in the resonating ring of the FOPO can lead to temporal broadening of the signal pulse or idler pulse. The chromatic dispersion may cause the pulse duration of the signal pulse or idler pulse to exceed the pulse duration of the pump laser amplified by the double-clad Yb fiber amplifier 106a. The FOPO resonating ring may be designed so that the round-trip time of the signal pulse and/or the idler pulse is an integer multiple of the repetition rate of the pump pulse. In which case only a part of the signal pulse will overlap with the incoming pump pulse. By applying a chirp to the signal pulse, a partial temporal overlap allows for only some of the spectral components of the signal pulse to interact with the new incoming pump pulse. Consequently, this narrowing of the pulse results in a progressive decrease in the spectral bandwidth of the signal pulse and/or idler pulse. This may be accomplished without the use of any narrow-band spectral filtering device in the resonating cavity of the FOPO. In an embodiment, the chirp of the signal pulse or idler pulse may provide a method of tuning the wavelength of the generated signal and idler pulse. By changing the cavity length with the delay line or changing the repetition rate of the pump pulse, the successive pump pulse overlaps with different spectral components of the signal pulse and/or idler pulse. So, the central wavelengths of the signal and idler can be shifted.

As a pump pulse which has high peak power is coupled into the HLNF 110 which converts from pump pulse to signal pulse, self-phase-modulation (SPM) occurs in connection fibers which connect the gain fiber 106a of main amplifier and the HNLF 110. As a result, the spectral bandwidth of pump pulse is broadened, and conversion efficiency from pump pulse to a signal pulse is decreased. Thus, it can be difficult to achieve high peak power of signal pulse. By adding the gain fiber 106c into the FOPO ring as illustrated in FIG. 3 the length of the connection fiber may be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An optical apparatus comprising:
an optical source that generates a pump pulse with a first optical wavelength, wherein a resonating cavity of the optical source includes:
a gain medium; and
a wavelength tunable filter for selecting light as the first optical wavelength; and
an optical loop comprising:
an input optical coupler comprising:
a first port for receiving the pump pulse;
a second port for receiving a signal pulse, wherein the signal pulse has a second optical wavelength different from the first optical wavelength; and
a third port for outputting the pump pulse and the signal pulse;
an optical waveguide comprising:
a fourth port for receiving the pump pulse and the signal pulse;
a fifth port outputting the pump pulse and the signal pulse; and
wherein energy in the pump pulse is transferred into energy in the signal pulse while a relative center position of the signal pulse is crossing a center position of the pump pulse in a first direction while both are passing through the waveguide; and
an output optical coupler comprising:
a sixth port for receiving the pump pulse and the signal pulse;
a seventh port for outputting a first portion of the signal pulse; and
an eighth port for outputting a second portion of the signal pulse; and
wherein the first portion of the signal pulse from the seventh port of the output coupler is fed into the second port as the signal pulse, completing the optical loop.

2. The optical apparatus according to claim 1, wherein the optical source further comprises:
wherein the resonating cavity is a linear cavity;
a saturable absorber forms a first terminus of the linear cavity;
wherein the optical source is passive mode locked to produce the pump pulse at the first optical wavelength;
a dispersion compensator forms a second terminus of the linear cavity;
the wavelength tunable filter is between the saturable absorber and the dispersion compensator in the linear cavity; and
a doped optical fiber having linear optical gain is also between the saturable absorber and the dispersion compensator in the linear cavity.

3. The optical apparatus according to claim 2 wherein within the resonating cavity of the optical source is a variable delay line.

4. The optical apparatus according to claim 2, wherein the saturable absorber mode locks the optical source.

5. The optical apparatus according to claim 1, wherein the following equations are satisfied:

$$0.1 \text{ nm} \leq \Delta\lambda \leq 1.0 \text{ nm};$$

$$D_{cavity} \times L \geq 1 \text{ ps/nm};$$

$\Delta\lambda$ is the bandwidth of the tunable filter at full width half maximum,
$D_{cavity}$ is the dispersion parameter of the cavity of the optical source; and
L is the total cavity length of the optical source.

6. The optical apparatus according to claim 5, wherein the dispersion parameter $D_{cavity}$ of the optical source is kept within the limit of following equation by a chirp in a chirped fiber Bragg grating that acts as a dispersion compensator of the cavity of the optical source:

$$D_{cavity} \times L \geq 1 \text{ ps/nm}.$$

7. The optical apparatus according to claim 1, wherein the energy of the pump pulse is converted to the energy of the signal pulse by a parametric process in the waveguide.

8. The optical apparatus according to claim 4, wherein a third idler pulse is produced by the waveguide.

9. The optical apparatus according to claim 1, wherein the optical waveguide comprises a photonic crystal fiber.

10. The optical apparatus according to claim 1, wherein:
the optical loop further comprises a second waveguide;
the length of the second waveguide satisfies the following equation:

$$L_3 \geq t/D_{pulse}$$

wherein $L_3$ is the length of the third waveguide;
t is the pulse duration of the pump pulse; and
$D_{pulse}$ is the dispersion parameter of the signal pulse in the second waveguide.

11. The optical apparatus according to claim 10, wherein the second waveguide changes a chirp in the signal pulse produced by the optical waveguide.

12. The optical apparatus according to claim 10, wherein the chirp in the second pulse is positive.

13. The optical apparatus according to claim 10, wherein the chirp in the second pulse is negative.

14. The optical apparatus according to claim 10, wherein the second waveguide is located between the seventh port of the output coupler and the second port of the input coupler, and the first portion of the signal pulse is fed through the second waveguide.

15. The optical apparatus according to claim 1, further comprising:
an optical amplifier between the optical source and the first port of the input coupler that amplifies the optical power of the pump pulse.

* * * * *